(12) United States Patent
Lee

(10) Patent No.: US 12,481,429 B2
(45) Date of Patent: Nov. 25, 2025

(54) CLIENT AND NETWORK BASED ERASURE CODE RECOVERY

(71) Applicant: Samsung Electronics Co., Ltd., Suwon-si (KR)

(72) Inventor: Ronald C. Lee, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 119 days.

(21) Appl. No.: 17/824,638

(22) Filed: May 25, 2022

(65) Prior Publication Data

US 2023/0305713 A1  Sep. 28, 2023

Related U.S. Application Data

(60) Provisional application No. 63/323,009, filed on Mar. 23, 2022.

(51) Int. Cl.
*G06F 12/00* (2006.01)
*G06F 3/06* (2006.01)
*G06F 11/10* (2006.01)

(52) U.S. Cl.
CPC .......... *G06F 3/0619* (2013.01); *G06F 3/0658* (2013.01); *G06F 3/067* (2013.01); *G06F 11/1004* (2013.01)

(58) Field of Classification Search
None
See application file for complete search history.

(56) References Cited

U.S. PATENT DOCUMENTS

| | | |
|---|---|---|
| 5,384,786 A | 1/1995 | Dudley et al. |
| 5,479,656 A | 12/1995 | Rawlings |
| 8,290,059 B2 | 10/2012 | Kang et al. |
| 8,839,073 B2 | 9/2014 | Cohen |
| 9,372,870 B1 | 6/2016 | Levy |
| 9,417,955 B2 | 8/2016 | Patterson et al. |
| 9,495,241 B2 | 11/2016 | Flynn et al. |
| 10,310,810 B2 | 6/2019 | Fukuchi |
| 10,466,906 B2 | 11/2019 | Benisty |
| 10,691,539 B2 | 6/2020 | Zamir et al. |
| 10,838,811 B1 | 11/2020 | Kuo |
| 10,846,017 B2 | 11/2020 | Agarwal |
| 10,897,273 B2 | 1/2021 | Lamberts et al. |
| 10,983,964 B1 | 4/2021 | Bono et al. |
| 11,171,666 B2 | 11/2021 | Nowoczynski |
| 11,200,168 B2 | 12/2021 | Johns |

(Continued)

OTHER PUBLICATIONS

EPO Extended Search Report dated Jul. 14, 2023, issued in corresponding European Patent Application No. 23160767.2 (7 pages).

*Primary Examiner* — Daniel D Tsui
(74) *Attorney, Agent, or Firm* — Lewis Roca Rothgerber Christie LLP

(57) ABSTRACT

A system and method for client and network based erasure code recovery. In some embodiments, the method includes: receiving, by a storage node, a get command; storing, by the storage node, in a memory of a host, using remote direct memory access, data specified by the get command, at a memory address specified by the get command; sending, by the storage node, a response, indicating successful execution of the get command; and performing, by the host, erasure code recovery based on the data.

19 Claims, 8 Drawing Sheets

(56) References Cited

U.S. PATENT DOCUMENTS

| | | | |
|---|---|---|---|
| 11,210,002 B2 | 12/2021 | Pitchumani et al. | |
| 11,500,719 B1* | 11/2022 | Srinivasan | G06F 11/1048 |
| 11,740,804 B1* | 8/2023 | Gordon | G06F 3/065 |
| | | | 711/162 |
| 2016/0342545 A1 | 11/2016 | Arai et al. | |
| 2018/0026655 A1 | 1/2018 | Gopal et al. | |
| 2018/0048732 A1* | 2/2018 | Zhu | H04L 67/1097 |
| 2018/0341549 A1 | 11/2018 | Bolkhovitin et al. | |
| 2019/0050289 A1 | 2/2019 | Kachare et al. | |
| 2020/0014688 A1* | 1/2020 | Kohli | H04L 9/0891 |
| 2020/0042386 A1* | 2/2020 | Pruett | G06F 3/0652 |
| 2020/0319812 A1 | 10/2020 | He et al. | |
| 2020/0348958 A1* | 11/2020 | Krasner | G06F 9/45558 |
| 2023/0259284 A1* | 8/2023 | Han | G06F 13/28 |

\* cited by examiner

CLIENT AND NETWORK BASED ERASURE CODE RECOVERY

CROSS-REFERENCE TO RELATED APPLICATION(S)

The present application claims priority to and the benefit of U.S. Provisional Application No. 63/323,009, filed Mar. 23, 2022, entitled "CLIENT/NETWORK BASED ERASURE CODE ERROR RECOVERY FOR OPTIMAL PERFORMANCE", the entire content of which is incorporated herein by reference.

FIELD

One or more aspects of embodiments according to the present disclosure relate to storage, and more particularly to a system and method for client and network based erasure code recovery.

BACKGROUND

For bandwidth intensive storage workloads, recovering lost data based on erasure codes may incur high overhead in a storage cluster (e.g., in a cluster of storage nodes). This erasure code recovery overhead may be intensified for distributed or scale-out systems where data may be sent over networks. Storage cluster based erasure recovery may also incur high latency.

It is with respect to this general technical environment that aspects of the present disclosure are related.

SUMMARY

In some embodiments, erasure code recovery may be performed in the host or client instead of being performed by the storage nodes of a storage system (e.g., a storage cluster). The host may include a Graphics Processing Unit (GPU), which may be configured to perform erasure code recovery, when a storage node fails, based on data blocks and parity data blocks received from the nodes that remain operational. In some embodiments, a sufficiently capable Network Interface Card (NIC) may perform the erasure code recovery and store the data, including the recovered data in the memory of the GPU, so that the failure of the node and the recovery of the data are transparent to the GPU.

According to an embodiment of the present disclosure, there is provided a method, including: receiving, by a storage node, a get command; storing, by the storage node, in a memory of a host, using remote direct memory access, data specified by the get command, at a memory address specified by the get command; sending, by the storage node, a response, indicating successful execution of the get command; and performing, by the host, erasure code recovery based on the data.

In some embodiments, the sending of the get command includes sending the get command over a Transmission Control Protocol (TCP) socket.

In some embodiments, the storing of the data includes storing the data using remote direct memory access over ethernet.

In some embodiments, the storing, by the storage node, of the data, includes storing the data using Remote Direct Memory Access over Converged Ethernet (RoCE).

In some embodiments, the get command includes a first scatter gather list for a first block of data.

In some embodiments, the get command includes a first scatter gather list for a block of parity bits.

In some embodiments: the host includes a Graphics Processing Unit (GPU), and the performing of the erasure code recovery includes performing erasure code recovery by the GPU.

In some embodiments, the performing of the erasure code recovery includes: storing parity data temporarily in a region of a shared parity memory pool, and freeing the region of the shared parity memory pool upon completion of the erasure code recovery.

In some embodiments: the host includes a Network Interface Card (NIC), and the performing of the erasure code recovery includes performing erasure code recovery by the NIC.

According to an embodiment of the present disclosure, there is provided a system, including: a host including a processing circuit; and a storage node including a processing circuit configured to: receive a get command; store, in a memory of the host, using remote direct memory access, data specified by the get command, at a memory address specified by the get command; and send a response, indicating successful execution of the get command, wherein the processing circuit of the host is configured to perform erasure code recovery based on the data.

In some embodiments, the sending of the get command includes sending the get command over a Transmission Control Protocol (TCP) socket.

In some embodiments, the storing of the data includes storing the data using remote direct memory access over ethernet.

In some embodiments, the storing of the data includes storing the data using Remote Direct Memory Access over Converged Ethernet (RoCE).

In some embodiments, the get command includes a first scatter gather list for a first block of data.

In some embodiments, the get command includes a first scatter gather list for a block of parity bits.

In some embodiments: the processing circuit of the host includes a Graphics Processing Unit (GPU), and the performing of the erasure code recovery includes performing erasure code recovery by the GPU.

In some embodiments, the performing of the erasure code recovery includes: storing parity data temporarily in a region of a shared parity memory pool, and freeing the region of the shared parity memory pool upon completion of the erasure code recovery.

In some embodiments: the host includes a Network Interface Card (NIC); and the performing of the erasure code recovery includes performing erasure code recovery by the NIC.

According to an embodiment of the present disclosure, there is provided a system, including: a host including means for processing; and a storage node including means for processing configured to: receive a get command; store, in a memory of the host, using remote direct memory access, data specified by the get command, at a memory address specified by the get command; and send a response, indicating successful execution of the get command wherein the means for processing of the host is configured to perform erasure code recovery based on the data.

In some embodiments: the host includes a Network Interface Card (NIC); and the performing of the erasure code recovery includes performing erasure code recovery, by the NIC.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
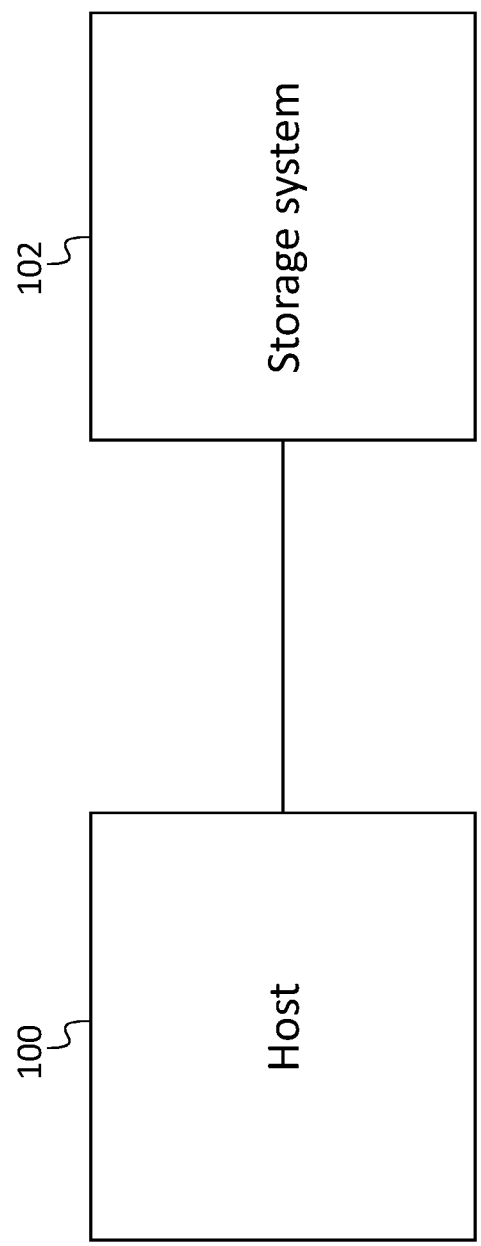
FIG. 1A shows a block diagram of a system including a host connected to a storage system, according to an embodiment of the present disclosure.

The detailed description set forth below in connection with the appended drawings is intended as a description of exemplary embodiments of a system and method for client and network based erasure code recovery provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Some file and object storage protocols may not support erasure code recovery (e.g., data recovery operations for restoring data after a storage node failure) on application hosts or clients. Such storage solutions may perform erasure code recovery on the local hardware system of the storage nodes before returning data to hosts, since all the storage devices are locally resident. Such a system may not handle node failures, however, and may require each node to be fault tolerant as a standalone system, a requirement that may increase complexity considerably. For some types of node-level erasure coding, handling the erasure code recovery at the storage nodes may require high overheads due to (i) network overheads incurred for rebuilds and (ii) the number of interactions, with the data, through the system network and hardware, involved. Recovering data at the storage nodes may also significantly increase the latency incurred by such a recovery operation.

In some embodiments, the overhead on the storage nodes and the latency incurred in performing erasure code recovery may be reduced by moving the data recovery burden to application hosts (or "clients" of the data storage system). Such embodiments may further involve leveraging remote direct memory access (RDMA) protocols to place data directly in application host memory such as GPU memory. In some embodiments, a data exchange protocol such as the Amazon S3 protocol may be extended to support the rebuilding of erasure coded data on an application host without explicit knowledge of the object data format. Such embodiments may provide (i) efficient failure recovery for erasure coded data on the initiator or receiving host, (ii) efficient failure recovery for erasure coded data using network components such as a network interface card (NIC) or switch, and (iii) methods to reduce application overhead for handling erasure coded data. Some embodiments include methods for on-the-fly erasure code recovery, using network components.

For example, in some embodiments, erasure code recovery may be performed in the host or client instead of being performed by the storage nodes of a storage system. The host may include a Graphics Processing Unit (GPU), which may be configured to perform erasure code recovery, when a storage node fails, based on data blocks and parity data blocks received from the nodes that remain operational. In some embodiments, a sufficiently capable Network Interface Card (NIC) may instead perform the erasure code recovery and store the data, including the recovered data in the memory of the GPU, so that the failure of the node and the recovery of the data are transparent to the GPU. As used herein, "data blocks" and "parity data blocks" are quantities of data and quantities of parity data, which may or may not coincide with "blocks" (e.g., physical blocks in a solid state drive) as they may be defined for a storage device.

Figure 1B:
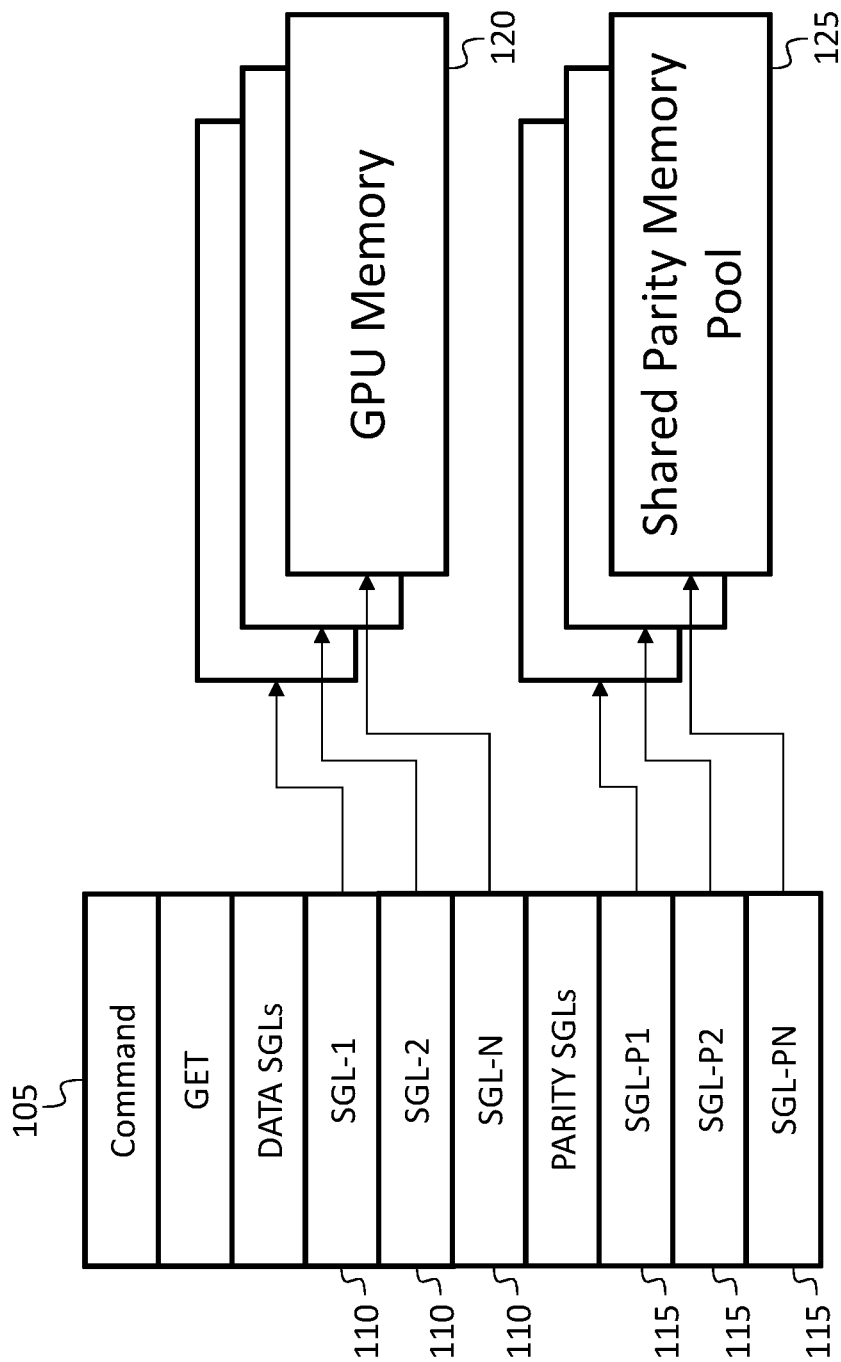
FIG. 1B is an illustration of a get command and of corresponding destination memory regions, according to an embodiment of the present disclosure.

FIG. 1A shows a block diagram of a system including a host 100 connected to a storage system 102. FIG. 1B shows a data format for a request 105 (including a command, e.g., an S3 command), in some embodiments. The request 105, in the example illustrated, is a get command (a command used by the host to request data from the storage system). The request may be sent by the host to one of the storage nodes, which may be designated as a "contact node", responsible for relaying certain communications (such as the request 105 and a response 130 (FIG. 1C; discussed in further detail below)) between the host and the other storage nodes. In the example of FIG. 1B, the host is aware that a storage node (node 5, as shown in further examples below) has failed, and the get command includes a scatter-gather list including list elements 110 for data blocks (identified in FIG. 1B as "SGL-1", "SGL-2", and "SGL-N") and a scatter-gather list 115 for parity data blocks (identified in FIG. 1B as "SGL-P1", "SGL-P2", and "SGL-P3"). The parity data blocks are fetched so that data that would ordinarily have been sent by the failed node may be recovered by the host, as discussed in further detail below. The scatter gather list is a list of elements each of which includes a destination memory address, which may be an address in host memory (e.g., in host Graphics Processing Unit (GPU) memory 120), at which the corresponding data are to be stored, using remote direct memory access. The data blocks may be stored in GPU memory as shown, and the parity data blocks may be stored in a shared parity memory pool 125 (which may also be in GPU memory), at addresses identified by the scatter gather list for parity data blocks, as discussed in further detail below.

Figure 1C:
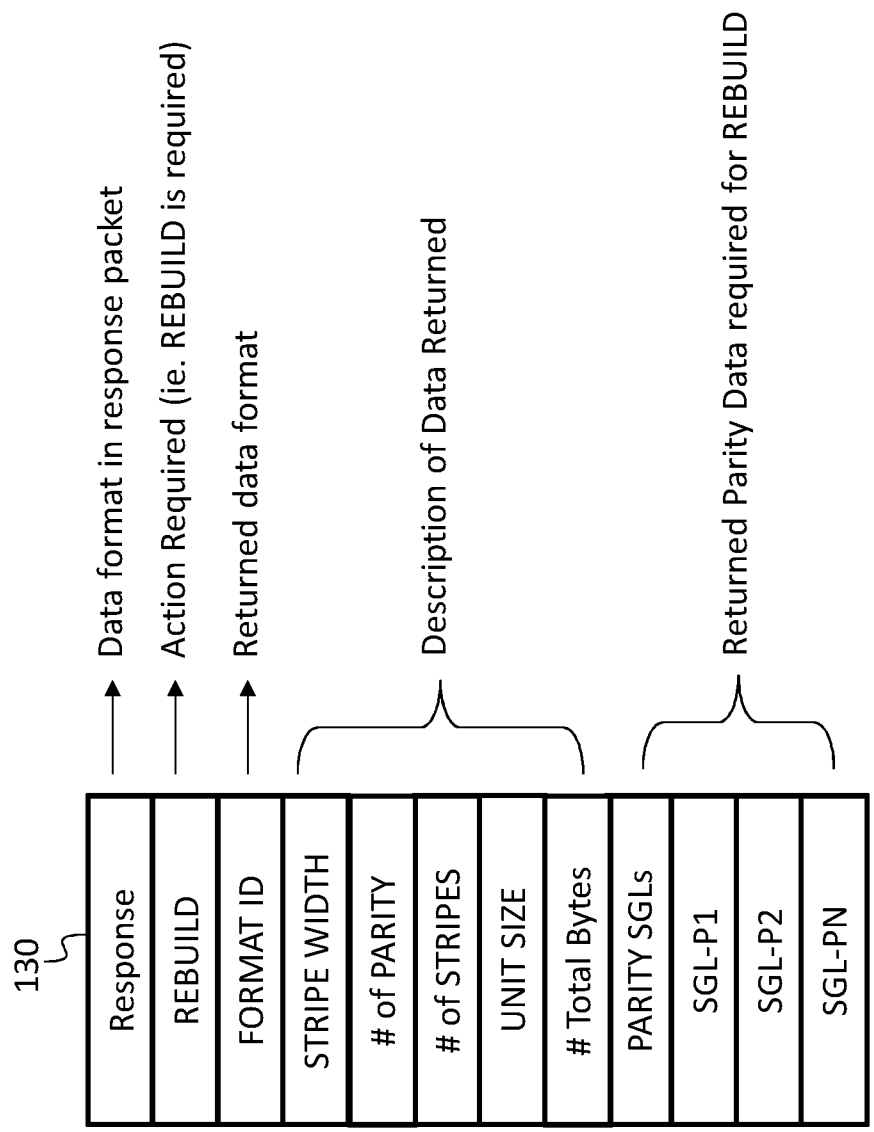
FIG. 1C is an illustration of a response, according to an embodiment of the present disclosure.

FIG. 1C shows a data format for a response 130 (e.g., an S3 response). The response may be sent to the host by the contact node (which may collect some of the data included in the response from other nodes), after the data blocks and parity data blocks have been copied to the host, to indicate the successful completion of the request (e.g., the returning to the host of the requested data, or the returning of sufficient data and parity data for reconstruction of the requested data). The response may include the parity data (identified in FIG. 1C as "SGL-P1", "SGL-P2", and "SGL-PN")).

Figure 2A:
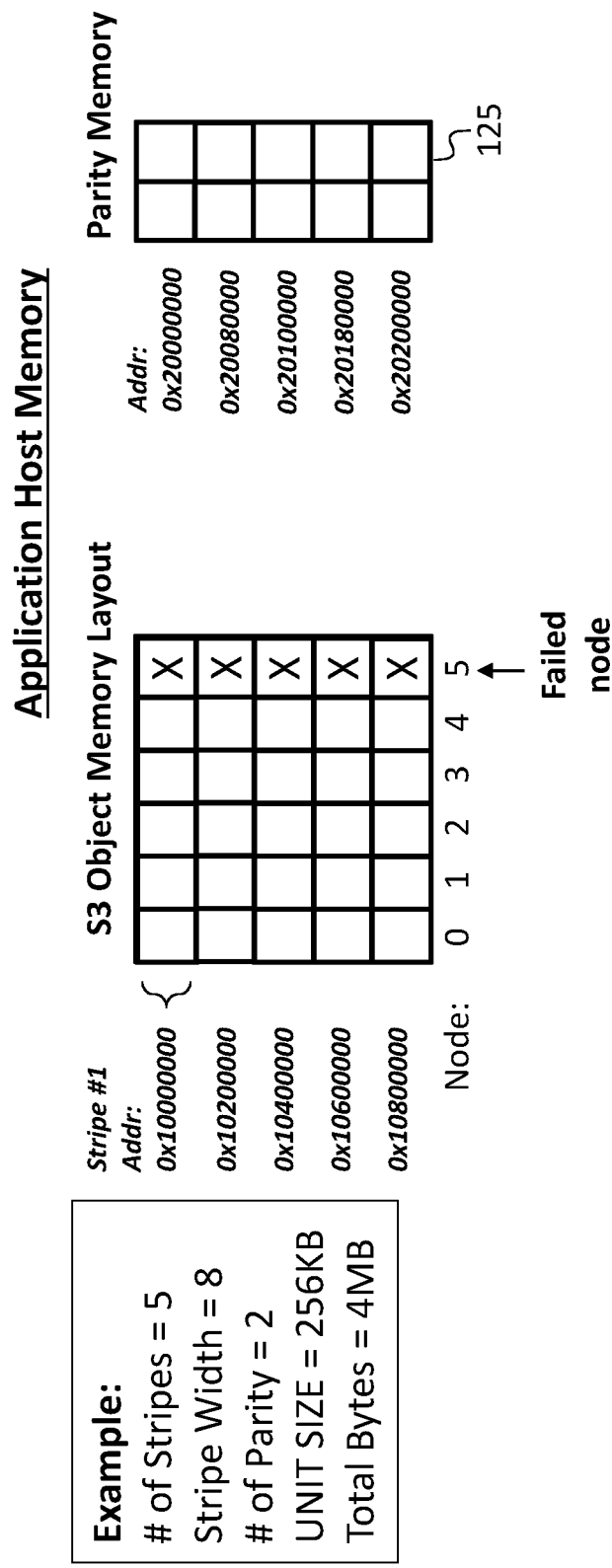
FIG. 2A is a data layout diagram, according to an embodiment of the present disclosure.

The data transfers between the storage nodes and the host may be performed, as mentioned above, using remote direct memory access, e.g., remote direct memory access over converged ethernet (RoCE), or over another type of connection suitable for use for remote direct memory access, e.g., Infiniband™. The request 105 and the response 130 may be sent over a separate channel, e.g., over a Transmission Control Protocol (TCP) socket. FIG. 2A shows a manner in which the data may be laid out in the storage nodes (e.g., arranged in stripes across the nodes); FIG. 2A also shows that the data blocks and parity data blocks retrieved from the storage nodes may be stored in object memory of the host, and the parity data blocks may be stored in parity memory of the host. The arrangement of the data in the host memory may be in accordance with the scatter gather lists as discussed in further detail below. The host may include, as mentioned above, a Graphics Processing Unit (GPU) with a dedicated memory (or "GPU memory"), which may be used by the host for data processing, performed, for example, using the data retrieved from the storage nodes. The GPU may also perform erasure code recovery, or, as discussed in further detail below, erasure code recovery may be performed by other hardware, e.g., by a smart NIC. Data from five nodes (nodes 0 through 4) are stored in stripes (with the first stripe beginning at address 0x10000000, the second stripe beginning at address 0x10200000, and so forth) with a portion of each stripe missing initially because, in the example of FIG. 2A, a sixth node (node 5) has failed. For this reason, parity data blocks are stored to the shared parity memory pool 125, and the GPU reconstructs, from the data including the parity data blocks, the data that would have been sent by the sixth node had it not failed, and stores it in the memory locations in which the sixth node would have stored it, had the sixth node not failed. Once the erasure code recovery is complete, the GPU may free the portion of the shared parity memory pool 125 that was used to perform the erasure code recovery; this memory then becomes available for other erasure code recovery operations.

Figures 2B, 2C:
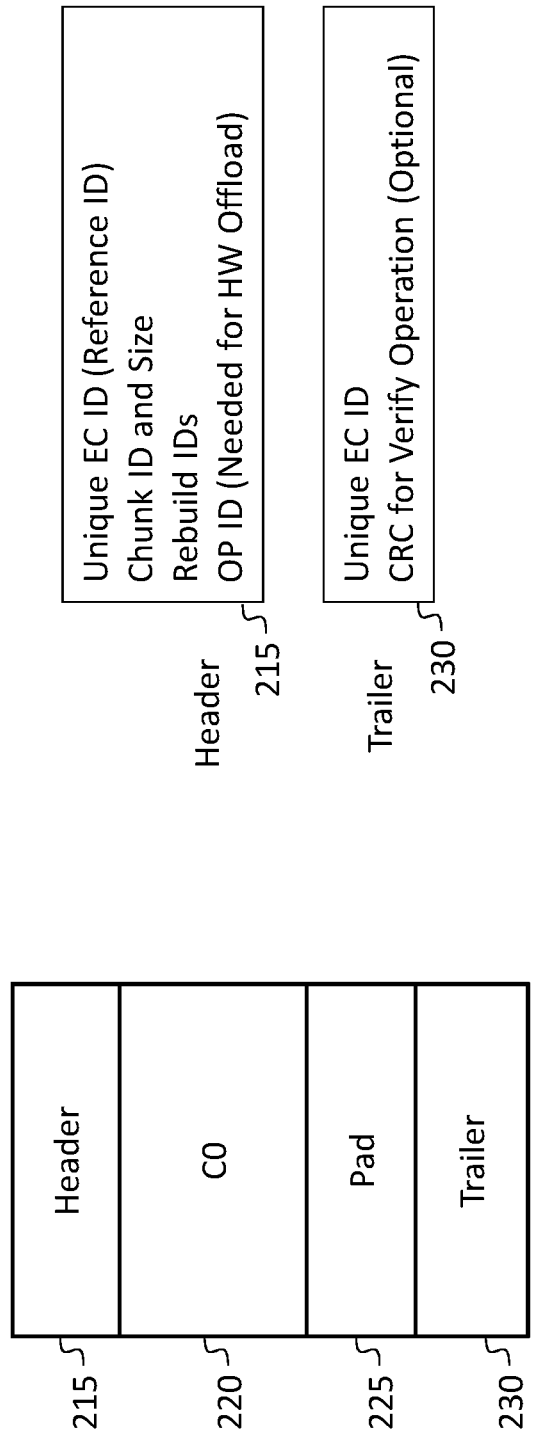
FIG. 2B is an illustration of a remote direct memory access unit, according to an embodiment of the present disclosure.
FIG. 2C is an illustration of a header and a trailer of a remote direct memory access unit, according to an embodiment of the present disclosure.

The data transmitted to the host by remote direct memory access may be packaged as (e.g., comprise or consist of) blocks that may be referred to as "remote direct memory access units". Each remote direct memory access unit may include, as illustrated in FIG. 2B, a header 215, a data payload 220, padding 225, and a trailer 230. Each payload may include a portion of a quantity of data specified by an element of one of the scatter gather lists of the request 105. The header 215 may include an erasure code identifier (EC ID) or "Reference ID", indicating which stripe the data payload 220 is part of, a data offset and chunk size, indicating where in memory the data payload 220 is to be stored, an erasure code rebuild identifier (ID), to indicate which data are to be recovered, and an operation identifier (OP ID) identifying the algorithm to be used for erasure code recovery. The trailer may also (optionally) include the erasure code identifier, and (optionally) a cyclic redundancy check (CRC) word for verifying whether the remote direct memory access unit was transmitted without errors. In some embodiments the trailer is absent.

Padding 225 may be included, e.g., in the last remote direct memory access unit sent in response to a request 105, if the total amount of data requested by the host is not a multiple of the total payload size of a remote direct memory access unit.

Figure 3A:
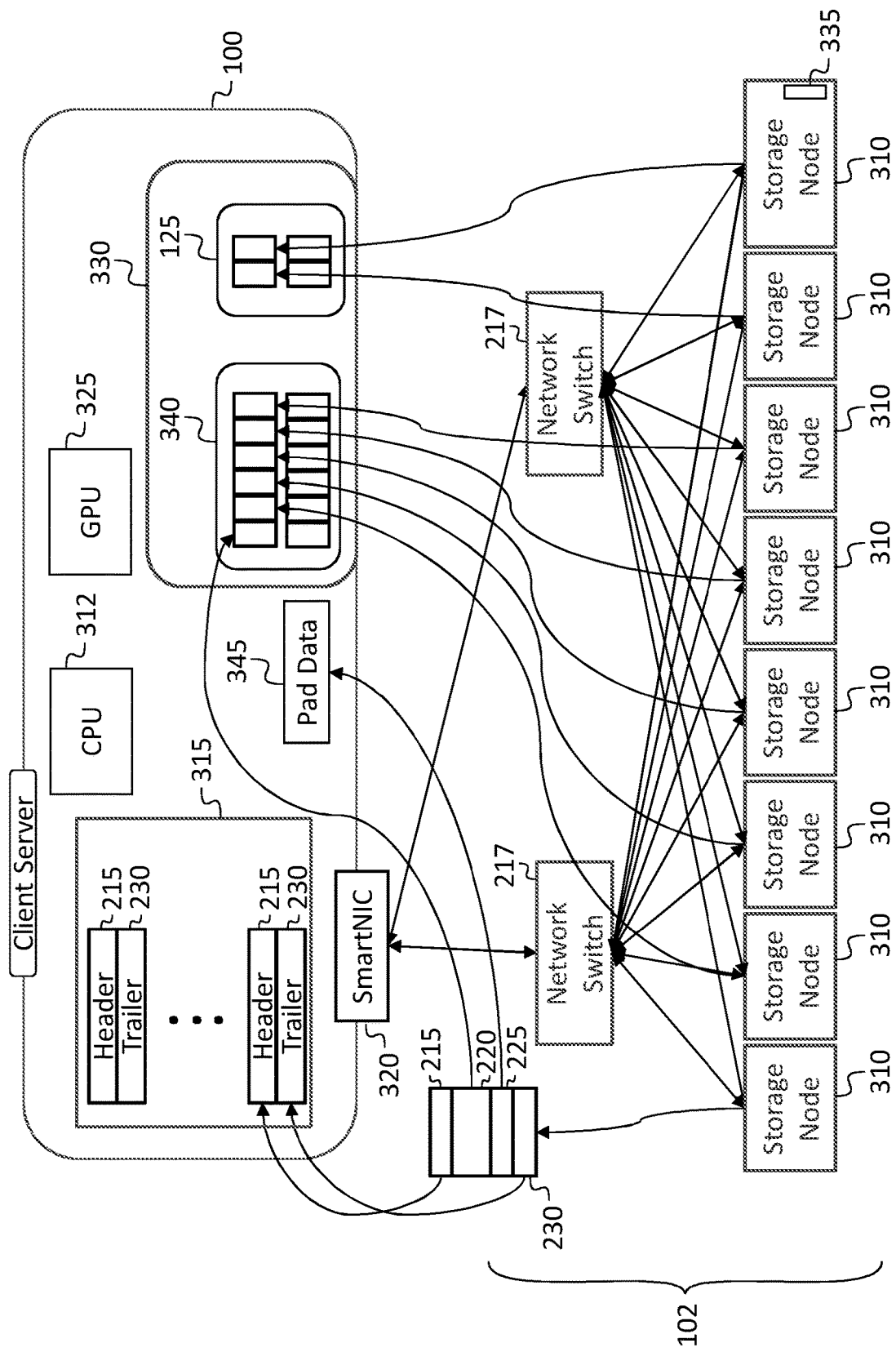
FIG. 3A is a block diagram of a system including storage nodes, according to an embodiment of the present disclosure.

FIG. 3A is a block diagram of a host 100 connected to a plurality of storage nodes 310 through network switches 315. The host includes a central processing unit (CPU) 312, a main memory 315 (connected to the CPU 312) a NIC 320 (which may be a smart NIC as illustrated) a GPU 325, and a GPU memory 330 (connected to the GPU 325). The NIC 320 may be connected to the main memory 315 and to the GPU memory 330 and it may be configured to perform remote direct memory access operations for writing data to the main memory 315 and to the GPU memory 330. Each of the plurality of storage nodes 310 may be connected to the host 100 through one or more network (e.g., ethernet) connections, e.g., through one or more network switches 217. Each network node may include a processing circuit 335 (shown explicitly in only one of the storage nodes 310, for ease of illustration), and persistent storage (e.g., flash memory).

In operation, the GPU memory 330 may be partitioned to include an object memory 340 and the shared parity memory pool 125. When all of the storage nodes 310 are operational, a get request sent to the storage nodes 310 by the CPU 312 may cause each storage node to send data to a respective region of the object memory 340, where it may be subject to further processing by the GPU 325. If one of the storage nodes 310 has failed, then each of the storage nodes 310 that remain operational may send data to (i) a respective region of the object memory 340, or (ii) (for the storage nodes 310 storing parity data) to the shared parity memory pool 125. In this case the data placed in the object memory 340 by the storage nodes 310 may have one or more gaps (in the one or more memory regions specified by the scatter gather list for data blocks) where the failed node would have placed data. The GPU 325 may then perform erasure code recovery based on the data in the object memory 340 and in the shared parity memory pool 125. The shared parity memory pool 125 may be used as a temporary shared parity buffer in the sense that, as mentioned above, once erasure code recovery is complete, the buffer may be freed up for use by another erasure code recovery operation, while the GPU 325 processes the data in the object memory 340. As each remote direct memory access unit is received, the NIC 320 may store the header 215 and the trailer 230 in the main memory 315. The host 100 may then infer, when all of the headers 215 and the trailers 230 have been stored in the main memory 315, that the transfer is complete (the absence of a header or trailer may signal that the node that would have sent the header or trailer may have failed). The storage nodes 310 storing parity data may store the parity data, in the shared parity memory pool 125, in response to receiving a get command containing a scatter gather list for parity data blocks.

In some embodiments, erasure code recovery may be performed by dedicated hardware, e.g., in the NIC 320 (which, in such an embodiment, may be referred to as a "smart NIC"), instead of being performed by the GPU 325 executing software for this purpose. In such an embodiment, the host 100 (e.g., the CPU 312) may notify the NIC 320 that a storage node 310 has failed, and configure the NIC 320 to perform erasure code recovery to recover data that ordinarily would be produced by the storage node 310 that has failed. Each inbound remote direct memory access unit may be received by the NIC 320, and the NIC 320 may perform erasure code recovery based on the data it receives, including the parity data, and store, in the object memory 340 (i)

the (non-parity) data blocks it receives from the storage nodes 310 that remain operational and (ii) the data blocks it recovers based on the data blocks and the parity data blocks it receives from the storage nodes 310 that remain operational. In such an embodiment there may be no shared parity memory pool 125 and the GPU 325 may not participate in erasure code recovery; moreover, the erasure code recovery may be transparent to the GPU 325, which may receive, in the object memory 340, the same data it would have received had none of the storage nodes 310 failed.

When pad data 225 are sent, they may be addressed, by the storage nodes 310, to a region of host memory (e.g., a region of main memory 315 or a region of GPU memory 330 allocated for this purpose), this region may be referred to as the "pad data space" 345 (it is illustrated outside of the main memory 315 and outside of the GPU memory 330 because it is not necessarily within either). The CPU 312 and the GPU 325 may ignore (e.g., not read) the data in the pad data space 345.

Figure 3B:
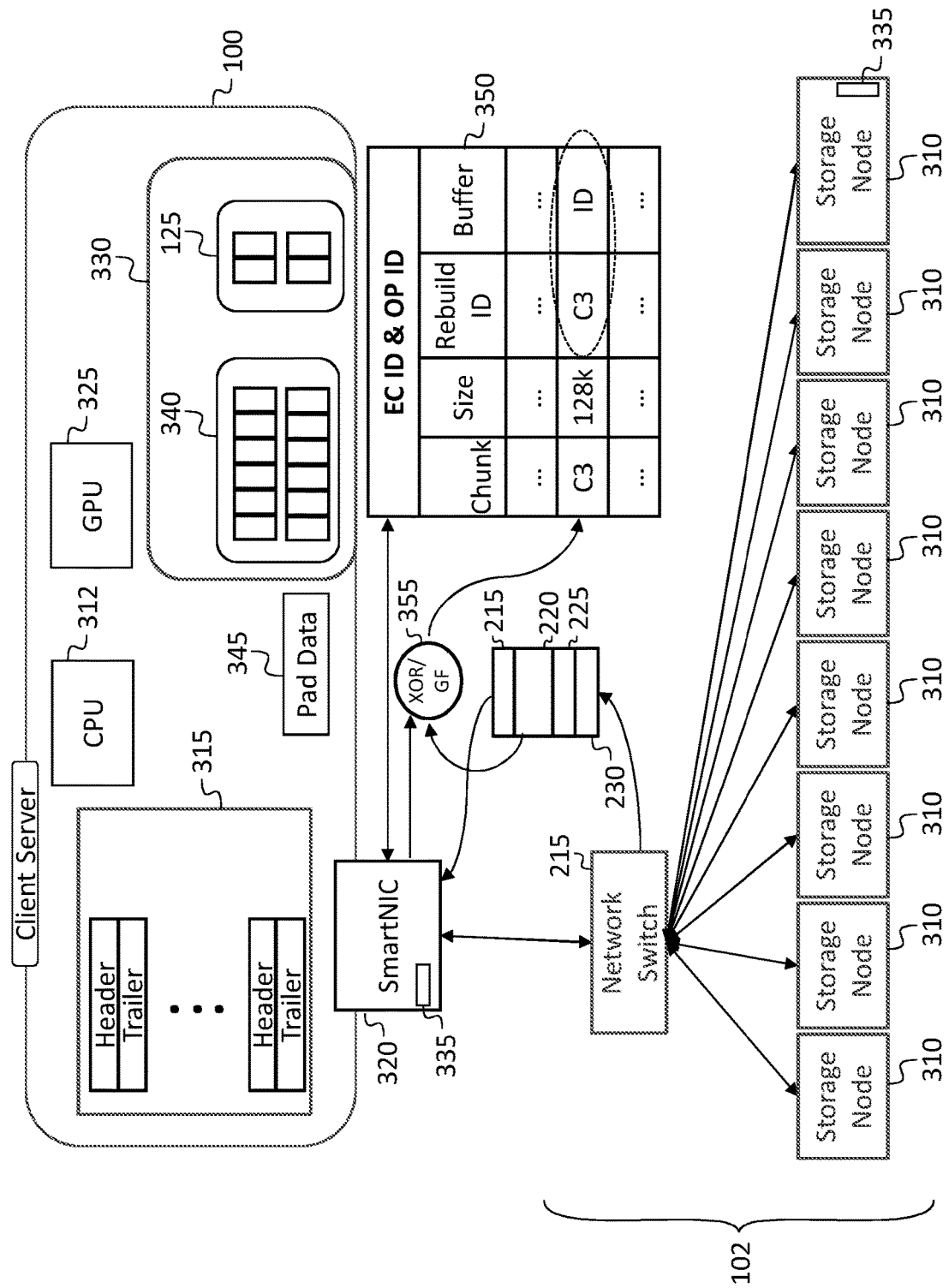
FIG. 3B is a diagram of the system of FIG. 3A in operation, according to an embodiment of the present disclosure.

FIG. 3B shows further details of the erasure code recovery process. When the host 100 is aware that a storage node 310 (e.g., the fourth storage node, storage node 3) has failed, it programs the NIC 320 to perform erasure code recovery, e.g., by configuring it with an erasure code recovery table 350 as shown. The erasure code recovery table 350 may include an error code identifier (EC ID) which identifies the input-output operation the data are related to, an operation identifier (OP ID) specifying the algorithm (e.g., exclusive or (XOR) or Galois field) used to perform the data recovery, a stripe unit (or "chunk") identifier and the size of the stripe unit, a rebuild identifier and a buffer identifier, identifying the address in object memory 340 where the rebuilt data are to be stored. The NIC 320 (or a processing circuit 335 of the NIC) may then recover the data (e.g., using an exclusive OR or Galois field, at 355) that the fourth storage node would have stored in the object memory 340, determine from the erasure code recovery table 350 where the data are to be stored in the object memory 340, and store the recovered data accordingly. When exclusive or is used, an exclusive or of the available data (the data from the nodes that have not failed, and the parity data) may be calculated, to generate the data that would have been provided by the failed node.

Figure 4:
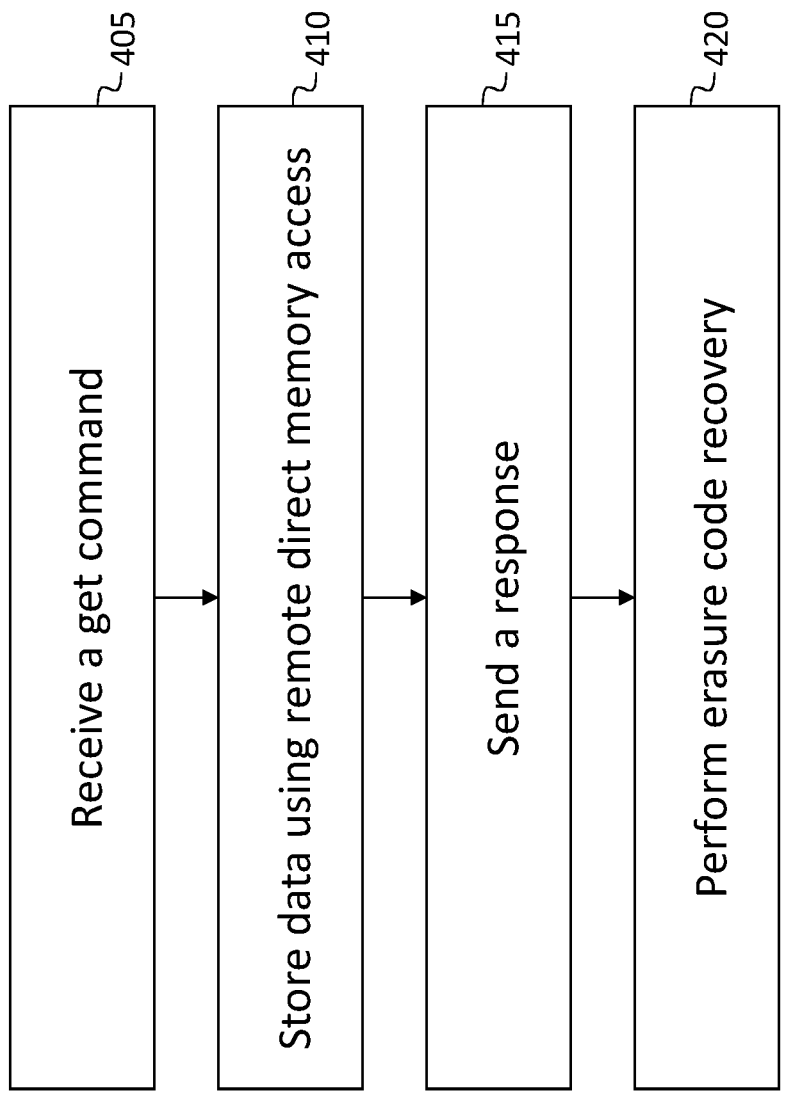
FIG. 4 is a flowchart of a method, according to an embodiment of the present disclosure.

FIG. 4 shows a flowchart of a method. In some embodiments, the method includes receiving, at 405, by a storage node, a get command; storing, at 410, by the storage node, in a memory of a host, using remote direct memory access, data specified by the get command, at a memory address specified by the get command; sending, at 415, by the storage node, a response, indicating successful execution of the get command and performing, by the host, erasure code recovery based on the data.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for client and network based erasure code recovery have been specifically described and illustrated herein, many modifications and variations will be apparent to those skilled in the art. Accordingly, it is to be understood that a system and method for client and network based erasure code recovery constructed according to principles of this disclosure may be embodied other than as specifically described herein. The invention is also defined in the following claims, and equivalents thereof.

What is claimed is:

1. A method, comprising:
receiving, by a storage node, a get command from a host, wherein the get command indicates a memory address in a memory of the host;
storing, by the storage node, in the memory of the host, using remote direct memory access, data specified by the get command, at the memory address specified by the get command, wherein the data includes a parity data;
based on storing by the storage node, in the memory of the host, the data including the parity data, transmitting by the storage node a response to the host, wherein the response includes the memory address storing the parity data; and
performing, by the host, erasure code recovery based on the data.

2. The method of claim 1, wherein the receiving of the get command comprises receiving the get command over a Transmission Control Protocol (TCP) socket.

3. The method of claim 1, wherein the storing of the data comprises storing the data using remote direct memory access over ethernet.

4. The method of claim 1, wherein the storing, by the storage node, of the data, comprises storing the data using Remote Direct Memory Access over Converged Ethernet (RoCE).

5. The method of claim 1, wherein the get command includes a first scatter gather list for a first block of data.

6. The method of claim 1, wherein the get command includes a first scatter gather list for a block of parity bits.

7. The method of claim 1, wherein:
the host comprises a Graphics Processing Unit (GPU), and
the performing of the erasure code recovery comprises performing erasure code recovery by the GPU.

8. The method of claim 1, wherein the performing of the erasure code recovery comprises:
storing parity data temporarily in a region of a shared parity memory pool, and
freeing the region of the shared parity memory pool upon completion of the erasure code recovery.

9. A system, comprising:
a host comprising a processing circuit; and
a storage node comprising a processing circuit configured to:
receive a get command from the host, wherein the get command indicates a memory address in a memory of the host;
store, in the memory of the host, using remote direct memory access, data specified by the get command, at the memory address specified by the get command, wherein the data includes a parity data; and
based on storing of the data including the parity data in the memory of the host, transmit a response to the host, wherein the response includes the memory address storing the parity data,
wherein the processing circuit of the host is configured to perform erasure code recovery based on the data.

10. The system of claim 9, wherein the receiving of the get command comprises receiving the get command over a Transmission Control Protocol (TCP) socket.

11. The system of claim 9, wherein the processing circuit being configured to store the data comprises the processing circuit being configured to store the data using remote direct memory access over ethernet.

12. The system of claim 9, wherein the processing circuit being configured to store the data comprises the processing circuit being configured to store the data using Remote Direct Memory Access over Converged Ethernet (RoCE).

13. The system of claim 9, wherein the get command includes a first scatter gather list for a first block of data.

14. The system of claim 9, wherein the get command includes a first scatter gather list for a block of parity bits.

15. The system of claim 9, wherein:
the processing circuit of the host comprises a Graphics Processing Unit (GPU), and
the performing of the erasure code recovery comprises performing erasure code recovery by the GPU.

16. The system of claim 9, wherein the performing of the erasure code recovery comprises:
storing parity data temporarily in a region of a shared parity memory pool, and
freeing the region of the shared parity memory pool upon completion of the erasure code recovery.

17. The system of claim 9, wherein:
the host comprises a Network Interface Card (NIC); and
the performing of the erasure code recovery comprises performing erasure code recovery by the NIC.

18. A system, comprising:
a host comprising means for processing; and
a storage node comprising means for processing configured to:
receive a get command from a host, wherein the get command indicates a memory address in a memory of the host;
store, in the memory of the host, using remote direct memory access, data specified by the get command, at the memory address specified by the get command, wherein the data includes a parity data; and
based on storing of the data including the parity data in the memory of the host, transmit a response to the host, wherein the response includes the memory address storing the parity data, wherein the means for processing of the host is configured to perform erasure code recovery based on the data.

19. The system of claim 18, wherein:
the host comprises a Network Interface Card (NIC); and
the performing of the erasure code recovery comprises performing erasure code recovery, by the NIC.

\* \* \* \* \*